Sept. 13, 1960
D. J. HANSEN
2,952,272
GAS REGULATOR
Filed April 29, 1953
3 Sheets-Sheet 1
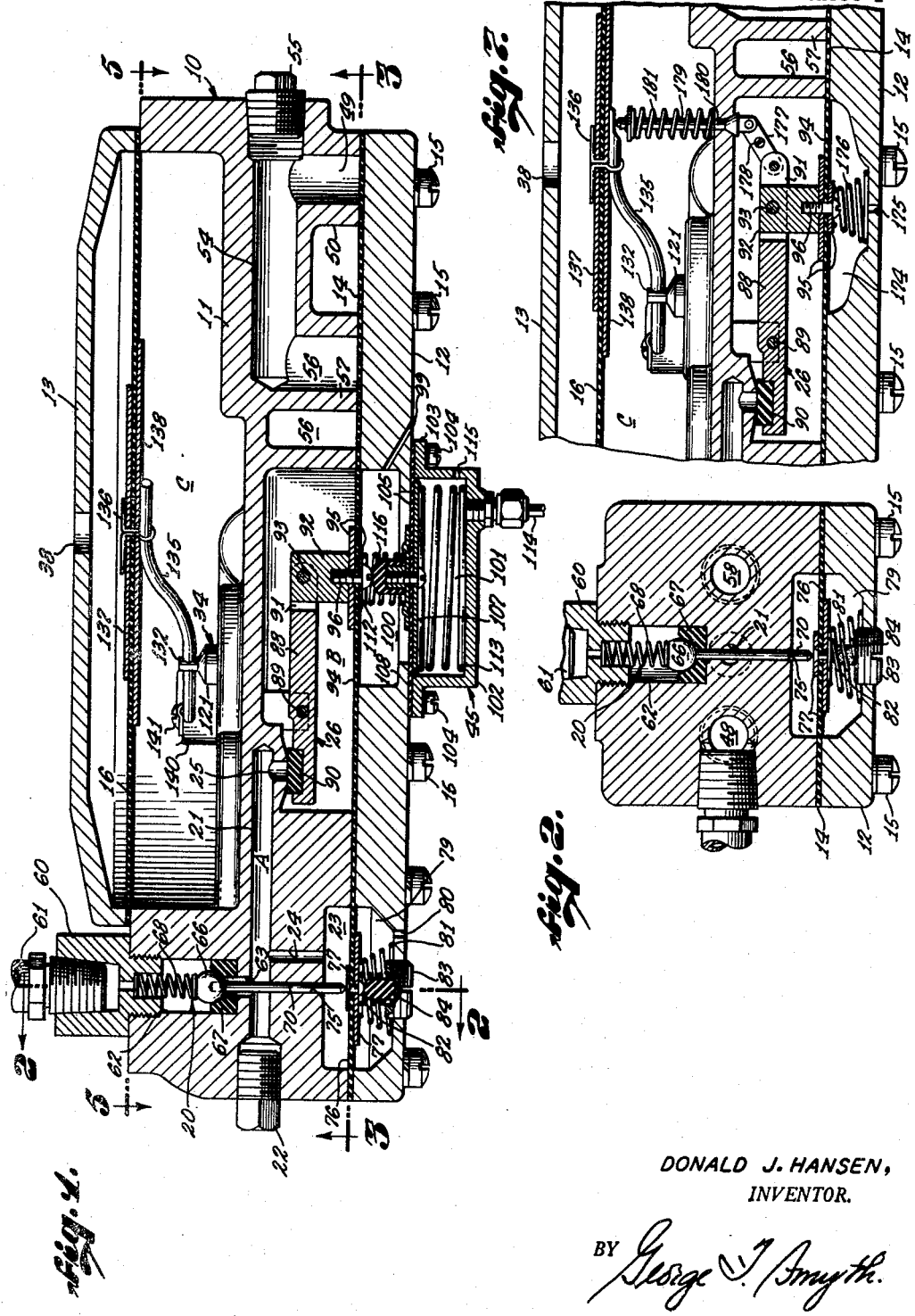
DONALD J. HANSEN,
INVENTOR.
BY *George J. Smyth.*
ATTORNEY.

Sept. 13, 1960 D. J. HANSEN 2,952,272
GAS REGULATOR

Filed April 29, 1953 3 Sheets-Sheet 2

DONALD J. HANSEN,
INVENTOR.

BY
ATTORNEY.

Sept. 13, 1960

D. J. HANSEN 2,952,272

GAS REGULATOR

Filed April 29, 1953

DONALD J. HANSEN,
INVENTOR.

BY *George J. Smyth*

ATTORNEY.

United States Patent Office 2,952,272
Patented Sept. 13, 1960

2,952,272

GAS REGULATOR

Donald J. Hansen, 3937 W. 106th St., Inglewood, Calif.

Filed Apr. 29, 1953, Ser. No. 351,892

8 Claims. (Cl. 137—483)

This invention relates to devices for releasing fluid from high pressure sources with controlled pressure reduction and has been initially embodied in a regulator for dispensing high pressure gaseous fuel to a fuel consuming device such as an internal combustion engine having a carburetor supplying fuel to the usual vacuum intake manifold. For the purpose of disclosure this particular embodiment will be described in detail in the knowledge that such a description will provide adequate guidance for those skilled in the art who may have occasion to apply the same principles to other specific purposes.

The type of regulator to which the invention pertains includes a primary chamber having an inlet port for communication with the high pressure fuel source, a pressure-responsive inlet valve that tends to limit the pressure in the primary chamber to a predetermined magnitude, and, finally some means for releasing gaseous fluid from the primary chamber to meet the fuel demands of the engine. In a typical regulator of this character, the means for controlling the release of fluid from the primary chamber includes a secondary chamber in communication therewith and a release valve that is responsive to pressure changes in the secondary chamber. The secondary chamber is connected to the intake manifold of the engine for pressure response in accord with the changing fuel requirements of the engine.

The various basic requirements for the efficient operation of such a regulator are well recognized. One requirement is that the regulator provide for effectively closing the inlet valve when the regulator is not meeting a fuel demand so that there will be no leakage of fuel to the engine when the engine is out of operation. Another requirement is that the regulator have adequate flow capacity to meet the maximum or peak demands of the engine. A further requirement is that the pressure of the fuel stream be accurately regulated over the whole range of magnitudes of fuel demand and especially in the range of lower magnitudes where close regulation is the most difficult to achieve. A still further requirement, which is closely related to the requirement for accurate control, is that the various valves operate easily to respond to relatively small control forces. Also of primary importance in the operation of an engine is the requirement that the regulator provide for a constant minimum fuel flow of predetermined magnitude for running the engine at idling speed.

Certain conflicting considerations are met in approaching the problem of meeting these requirements in the construction of a regulator of this general type. One such conflict arises, for example, in the construction of the release valve that controls the flow of fluid from the primary chamber into the secondary chamber for conveyance into the engine intake. To prevent leakage when the engine is out of operation, it is essential to employ a valve of the self-sealing type having a pressure-responsive area of effective magnitude exposed to the pressure of the primary chamber to exert sealing pressure on the movable parts of the valve. The difficulty is that a pressure-responsive area of sufficient size to preclude leakage creates a strong force that must be dealt with in the initial opening of the valve. It is possible, of course, to use a stronger force to open the valve, but low magnitude valve-operating forces are desirable for accurate regulation.

The present invention resolves this conflict by providing, in effect, two release valves or a dual valve construction comprising a main release valve and a smaller auxiliary release valve. The arrangement is such that the relatively small auxiliary release valve opens in advance of the main release valve and thereby creates local reduction of the normal back pressure that opposes opening of the main valve. Since relatively little force is required to open the auxiliary valve and the opening of the auxiliary valve reduces the magnitude of force required for subsequent opening of the main valve, only moderate valve opening force is required and the resulting valve action is exceptionally smooth.

A second conflict arises between the requirement for high capacity flow to meet peak fuel demands and the requirement for accurate regulation over the whole range of demands. High flow capacity requires a high pressure drop, but a high pressure drop makes close control difficult if not impractical at low levels of fuel demand.

The present invention solves this second conflict in part by providing a series of successive stages of chamber-to-chamber pressure drop so that over-all regulation does not depend upon the action of a single valve means. The invention further meets this second conflict by modifying the valve action at one or more of the stages of pressure drop in accord with different levels of fuel demand by the engine. Thus a relatively low pressure drop will normally prevail between two successive flow chambers, but the valve action will be automatically modified to increase the pressure drop in response to peak fuel demands.

A third conflict arises with respect to the requirement for fuel at a minimum rate for idling the engine and the requirement for accurately metering fuel over an intermediate range of fuel demands above this minimum demand. It has been found that a release valve for automatic graduated regulation of fuel flow over an extensive intermediate range of engine demands will not operate properly if its responsiveness is extended to include the extremely low minimum demand of an idling engine. There is an inherent conflict between the sensitivity of valve responsiveness needed for accurate control over the range and the steepness of the response curve required to include the minimum idling fuel rate. The threshold of responsiveness of the release valve to reduction of pressure in the primary chamber should be above the pressure differential between the two chambers that exists when the engine is idling.

The invention solves this difficulty by providing a separate valve-controlling arrangement that responds to the vacuum in the intake manifold of the idling engine. This additional means may be an auxiliary valve means controlling a by-pass around the final release valve. A feature of the preferred practice of the invention is the use of such a by-pass not only for supplying fuel at a relatively low rate for idling the engine, but also for supplying fuel to start the engine. For this purpose, the valve controlling the by-pass is not only pressure-responsive to respond to the vacuum in the intake manifold of the idling engine, but is also electrically responsive to respond to the electrical system of the engine when the engine is started.

The various features and advantages of the regulator may be understood from the following detailed description considered with the accompanying drawings.

In the drawings, which are to be regarded as merely illustrative:

Figure 1 is a cross-section of the presently preferred embodiment of the invention taken along the broken lines 1—1 of Figures 3 and 5;

Figure 2 is a section taken as indicated by the line 2—2 of Figure 1 showing the construction of the inlet valve of the regulator;

Figure 7 is a fragmentary section similar to Figure 1 showing a modification of the invention.

Figure 3:
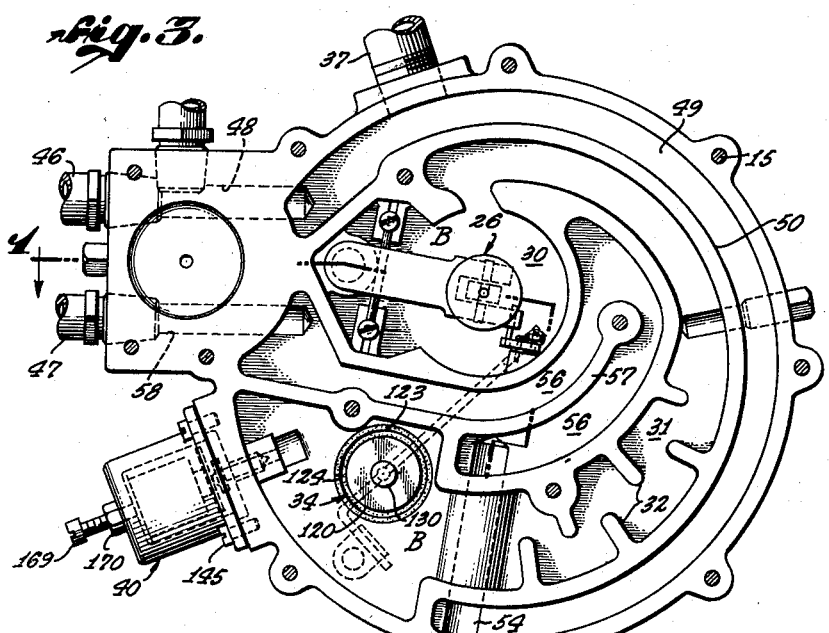
Figure 3 is a section taken as indicated by the line 3—3 of Figure 1.

In the present embodiment of the invention, the body structure of the regulator comprises the following separate parts: a cylindrical casing body 10 having an intermediate wall or web 11 spanning its interior; a heavy cover plate 12 on one side of the casing body; and a lighter cover plate 13 on the other side of the body. One side of the body is spanned by a flexible sheet 14 held in place by the heavy cover plate 12 and its associated screws 15 and, in like manner, the other side of the casing body is spanned by a second flexible sheet 16 held in place by the lighter cover plate 13 and the associated screws 17.

High pressure gaseous fluid, for example butane, from a high pressure supply tank enters the regulator through an inlet valve, designated as a whole by numeral 20, and passes into what may be termed a primary chamber A. Primary chamber A comprises a main passage 21 in the form of a bore closed by a plug 22 and a control cavity 23 which is connected with the main passage by a short passage or bore 24.

From the primary chamber A, the gaseous fluid flows through a port 25 into what may be termed a secondary chamber B under the control of what may be termed an intermediate valve, designated as a whole by numeral 26. As best shown in Figure 3, the secondary chamber B has three parts, namely, a cavity portion 30 in which the intermediate valve 26 is mounted, a tortuous passage portion 31 having staggered baffles 32, and a second cavity portion 33 in which is mounted what may be termed a release valve, designated as a whole by numeral 34.

Fluid released from the secondary chamber B by the release valve 34 enters a third chamber C which has a discharge port 36 (Figure 5) the discharge port being adapted for connection with the carburetor of the engine by suitable tubing 37. One wall of the third chamber C is the previously mentioned flexible sheet 16 which serves as a diaphragm to control the release valve 34. The outer face of this diaphragm 16 is subject to atmospheric pressure by virtue of a suitable vent port 38 in the cover plate 13.

As will be explained, the preferred practice of the invention includes what may be termed an auxiliary economizer control means, designated as a whole by numeral 40 (Figures 3 and 4) for meeting relatively low level fuel demands and includes what may be termed an auxiliary booster control means 45 (Figure 1) for meeting peak fuel demands.

The preferred practice of the invention is further characterized by the inclusion of a heating system for raising the temperature of the gaseous fuel flowing through the regulator. For this purpose the regulator is connected with the water cooling system of the engine by tubing 46 and 47 to permit the heated water from the engine cooling system to circulate through the regulator. As best shown in Figure 3, heated water from the tubing 46 passes through a bore 48 into an arcuate passage 49 that is separated from the secondary chamber B by a wall 50. As best shown in Figure 1, heated water from the arcuate passage 49 enters a radial bore 54, the outer end of which is closed by a suitable plug 55. The radial bore 54 leads to an inner water passage 56 which is surrounded by the secondary chamber B and doubles back along a wall 57 to a discharge bore 58 leading to the second tubing 47.

As shown in Figures 1 and 2, the gaseous fuel from the high pressure source reaches the inlet valve 20 through a bushing 60 which is adapted for threaded connection with supply tubing 61. The bushing 60 closes the outer end of a valve chamber 62 that has a port 63 leading to the primary chamber A. The inlet valve 20 comprises a valve member in the form of a ball 66 which co-operates with a valve seat 67 in the form of a ring of rubber-like material. A suitable coiled spring 68 having one end seated in the bushing 60 as shown urges the ball 66 to closed position against the valve seat 67.

For the purpose of control of the inlet valve 20, the ball member 66 carries an operating stem 70 that extends downward through a bore 75 into the control cavity 23 close to the flexible sheet 14. The portion 76 of the flexible sheet 14 that spans the control cavity 23 constitutes a diaphragm for actuating the valve stem 70. The opposite faces of this diaphragm 76 are engaged by a pair of interconnected discs 77 and suitable spring means exerts force against the outer side of the diaphragm to determine the normal prevailing pressure in the primary chamber A. The required spring means is mounted in a cavity 79 in the cover plate 12 which cavity has small vent port 80 to the atmosphere. The spring means may comprise an outer conical spiral spring 81 and an inner coiled spring 82. The inner spring seats in a plug 83 that is adapted for adjustment by a screw driver. Preferably a buffer body 84 made of rubber or similar elastic material is mounted inside the coiled spring 82 which engages the fastener means interconnecting the discs 77 to serve as damping means to prevent the diaphragm 76 and the ball member 66 from chattering or vibrating during operation of the regulator.

It is apparent that the total pressure exerted by the two springs 81 and 82 on the diaphragm 76 will determine the pressure in the primary chamber A, since lowering of the pressure in the primary chamber will result in the two springs acting on the diaphragm to actuate the valve stem 70 to unseat the ball member 66. Preferably the plug 83 that controls the effectiveness of the inner spring 82 is adjusted for approximately 40 pounds per square inch pressure in the primary chamber.

A feature of the described arrangement is that the desired pressure of 40 pounds per square inch is maintained substantially constant at all rates of full flow through the regulator as may be demonstrated by substituting a pressure gauge for the plug 22. A certain automatic action for this purpose is provided by the bore 24. Any increase in velocity of flow in the main passage 21 causes a drop in pressure in the bore 24 which is communicated to the control cavity 23 and causes inward flexure of the diaphragm 76 thereby to cause compensating opening action of the inlet valve 20.

The intermediate valve 26 that controls flow from the primary chamber A into the secondary chamber B comprises a valve operating means in the form of a lever 88 that is mounted on a pivot pin 89 and carries a valve member in the form of a body 90 of rubber-like material adapted to releasably seal the port 25 from the primary chamber A. The lever 88 is forked to provide two parallel arms 91 that straddle an actuating member 92 and are pivotally connected to the actuating member by a cross-pin 93. The actuating member 92 is controlled by an inner diaphragm 94 which comprises a portion of the previously mentioned flexible sheet 14. The inner diaphragm 94 is engaged on its opposite faces by a pair of discs 95 that are held together by a suitable screw 96. The screw 96 extends into the actuating member 92 for the purpose of mounting the actuating member on the inner face of the diaphragm.

The cover plate 12 is formed with a cavity 100 adjacent the inner diaphragm 94, which cavity may be termed the inner spring cavity for control of the intermediate valve. This cavity 100 has a vent passage 99 to the atmosphere. A second outer spring cavity 101 is provided by a cup-shaped body 102 of the previously mentioned auxiliary booster control means 45 that functions to meet peak fuel demands. The cup-shaped body 102 has a circumferential flange 103 to receive screws 104. The screws 104 not only serve to attach the cup-shaped body to the cover plate 12, but also serve to retain an outer diaphragm 105 that separates the outer spring cavity 101 from the inner spring cavity 100.

The outer diaphragm 105 is engaged by a relatively small disc 106 on its inner side and by a relatively large disc 107 on its outer side in the outer spring cavity 101. It will be noted in Figure 1 that the larger disc 107 overlaps a rim portion 108 of the inner spring cavity 100 to prevent the outer diaphragm 105 from flexing inward into the inner spring cavity 100, but the outer diaphragm is free to flex outward into the outer spring cavity 101.

A relatively small and light coiled spring 112 is in compression between the outer diaphragm 105 and the inner diaphragm 94 that actuates the intermediate valve 26. A second larger and heavier spring 113 is mounted in the cup-shaped body 102 to press against the larger disc 107 on the outer diaphragm 105. The cup-shaped member 102 is adapted for connection with the intake manifold of the engine and for this purpose has a control port connected to a suitable vacuum tube 114 leading to the engine intake manifold and has a suitable vent or bleed port 115 to the atmosphere.

It is apparent that a drop in pressure in the outer spring cavity 101 relative to atmospheric pressure will cause the outer diaphragm 105 to flex outward in opposition to the larger spring 113 with consequent reduction of the force exerted by the smaller spring 112 against the inner diaphragm 94. Since the spring pressure exerted against the inner diaphragm 94 determines the fluid pressure in the secondary chamber B, the result of outward flexure of the outer diaphragm 105 is to lower the pressure prevailing in the secondary chamber. Preferably a buffer body 116 of rubber or the like is mounted inside the coiled spring 112 to dampen the operation of the diaphragm 94.

In the absence of a high vacuum in the outer spring cavity 101, the pressure exerted by the spring 112 against the diaphragm 94 may, for example, be equivalent to 5 pounds per square inch pressure in the secondary chamber B and the effect of a high vacuum in the outer diaphragm chamber 101 in causing outward flexure of the outer diaphragm 105 may be to reduce the pressure exerted by the spring 112 to the equivalent of approximately 2 pounds per square inch in the secondary chamber. Thus during idling and during normal running of the engine, the vacuum in cavity 101 causes the spring 113 to be collapsed by the diaphragm 105 so that the pressure in chamber B is two pounds per square inch. But when acceleration of the engine reduces the vacuum in the cavity 101, the spring 113 expands to its limit to raise the pressure in chamber B to five pounds per square inch. This higher pressure causes accelerated fluid flow from the chamber B to the chamber C to supply fuel to the engine at an accelerated rate to meet the increased fuel demand.

Figure 6:
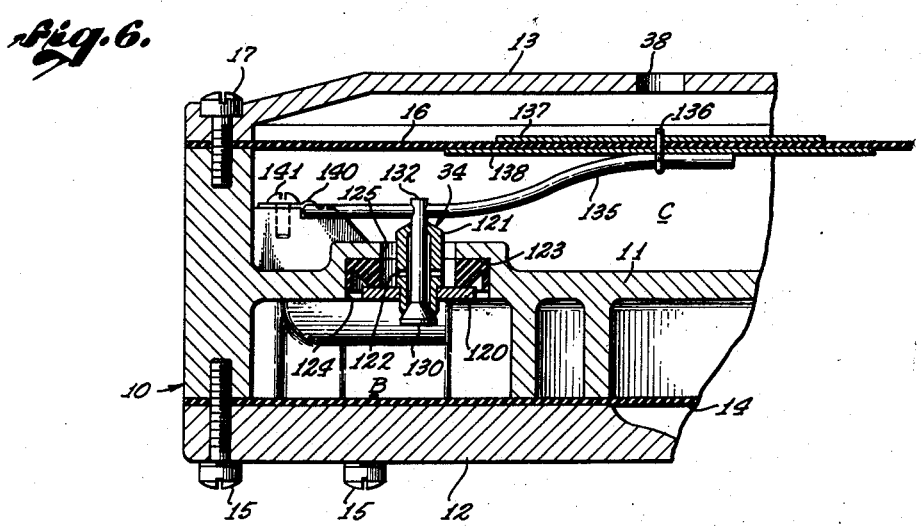
Figure 6 is a fragmentary section taken as indicated by the line 6—6 of Figure 5.

Preferably the release valve 34 that controls the flow of gaseous fuel from the secondary chamber B into the third chamber C is a dual valve comprising a main release valve and an auxiliary release valve. In the present construction, the main release valve, as best shown in Figure 6, includes a disc-shaped valve member 120 having a tubular stem 121 with radial ports 122. The valve member 120 co-operates with an annular valve seat member 123 of suitable rubber-like material that is mounted in a circular recess 124 in the previously mentioned intermediate wall 11. The valve seat member 123 surrounds a relatively large port 125 through which the gaseous fuel flows from the secondary chamber B into the third chamber C. It will be noted that the disc-shaped valve member 120 has a relatively large area for response to pressure in the secondary chamber B so that the valve tends to seal shut.

The lower end of the tubular valve stem 121, as viewed in Figure 6, serves as a valve seat for an auxiliary conical valve member 130 having a relatively long stem 132 that extends upward through and beyond the tubular valve stem 121. Here again, the pressure in the secondary chamber B tends to maintain the auxiliary valve member 130 in its closed position.

Figure 5:
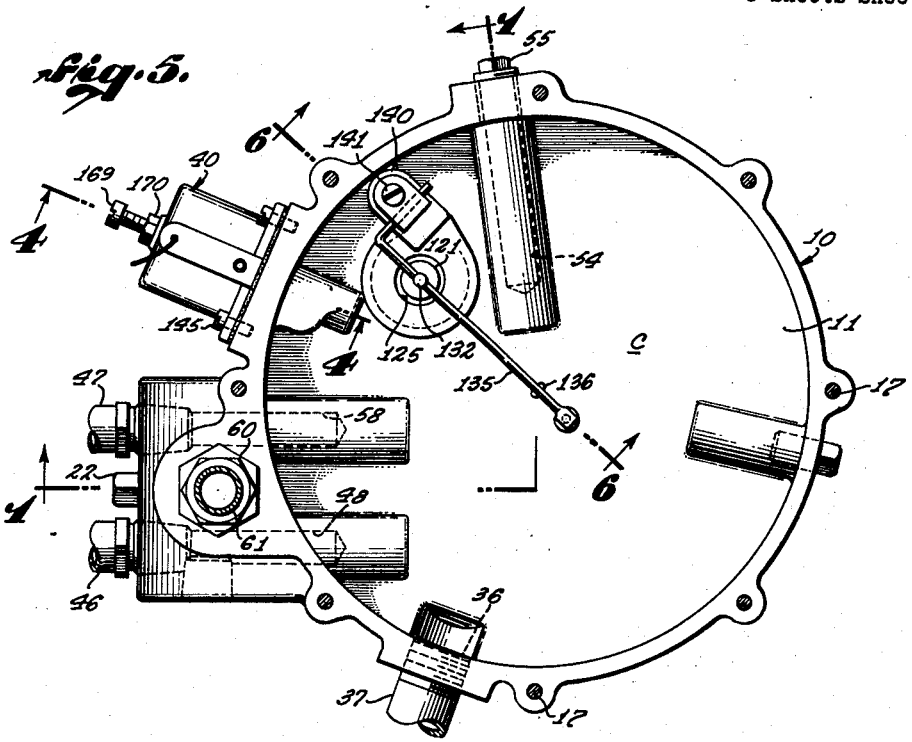
Figure 5 is a section taken as indicated by the line 5—5 of Figure 1.

The upper end of the valve stem 132, as viewed in Figure 6, is operatively connected to a lever 135 that is in turn operatively connected to the diaphragm 16 that separates the third chamber C from the atmosphere. The lever 135 may be connected to the diaphragm 16 by means of a wire clip 136 that extends through to thin metal discs 137 and 138 on opposite sides of the diaphragm. As best shown in Figure 5, the lever 135 is bent to an angle to journal in a bearing 140, which bearing may be of split construction with the two parts thereof held together by a suitable screw 141.

When the carburetor of the engine draws fuel from the third chamber C through the discharge port 36, the consequent drop in pressure in the third chamber C relative to atmospheric pressure causes the diaphragm 16 to flex inward. First, the diaphragm 16 acting through lever 135, opens the auxiliary release valve by shifting the auxiliary valve member 130 to open position. With continued inward flexure of the diaphragm 16, the lever 135 swings downward against the upper end of the tubular valve stem 132 to force the main disc shaped valve member 120 into open position.

Figures 4, 8:
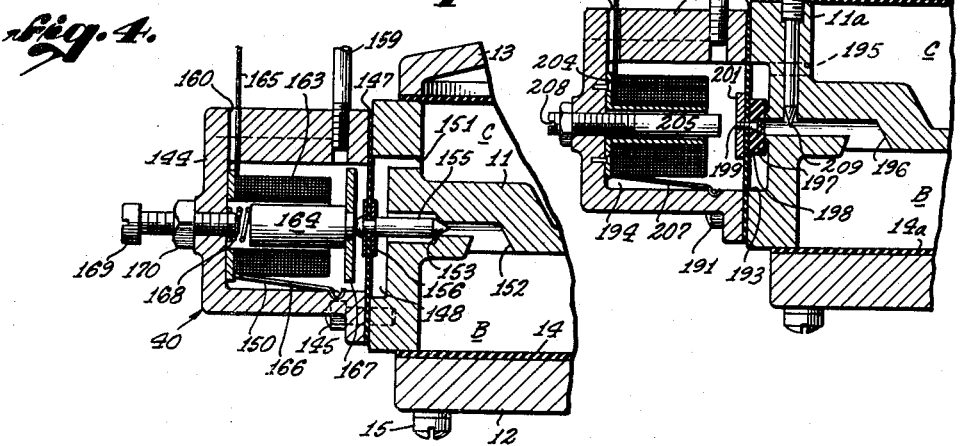
Figure 4 is a section taken as indicated by the line 4—4 of Figure 5.
Figure 8 is a sectional view showing a modified form of one control of the regulator.

The auxiliary economizer control 40 for response to low level fuel demands may comprise a cup-shaped body 144 mounted on the main casing body 10 by suitable screws 145. As best shown in Figure 4, the cup-shaped body 144 and the screws 145 serve to secure a control diaphragm 147 that spans a cavity 148 in the main casing body 10 and separates the cavity from what may be termed the control chamber 150 inside the cup-shaped member 144. The cavity 148 communicates with the third chamber C through a passage 151 and communicates with the secondary chamber B through a passage 152 in the intermediate wall 11. The passage 152 is formed with a valve seat 153 for co-operation with a valve member 155. The valve member 155 is mounted on the control diaphragm 147 by means of a pair of discs 156 so that the valve member will be retracted to open position by outward flexure of the diaphragm.

The control chamber 150 is adapted for connection with the intake manifold of the engine and for this purpose has a control port connected to a vacuum tube 159 leading to the engine intake manifold and is provided with a suitable vent or bleed port 160 to the atmosphere. It is apparent that when the pressure in the control chamber 150 is reduced by the suction effect of the engine intake manifold, the diaphragm 147 will respond by outward flexure with consequent retraction of the valve member 155 to permit flow of fuel from the secondary chamber B to the third chamber C. The path of flow is through the passage 152 into the cavity 148 and from the cavity 148 through the passage 151 into the third chamber C.

Preferably a suitable solenoid 163 having a floating core 164 is mounted in the control chamber 150 for energization by the starting circuit of the engine. The solenoid circuit includes a wire 165 extending through the bleed port 60 and a second grounded wire 166. The floating core 164 which is shown with a disc shaped armature 167 is normally urged against the control diaphragm 147 by a suitable spring 168. The range of movement of the floating core 164, and therefore the range of movement of the control diaphragm 147 together with the valve member 155, is limited by a suitable set screw 169 which may be secured at adjusted positions by a suitable lock nut 170.

The operation of the regulator may be readily understood from the foregoing description. Preferably, but not necessarily, the regulator is mounted with the two cover plates 12 and 13 more or less vertical. When the engine supplied by the regulator is not running, pressure in the third chamber C is atmospheric pressure and consequently the diaphragm 16 is at the non-operating position shown in Figure 1.

As heretofore stated, the pressure in the primary chamber A, with the inlet valve 20 closed, is on the order of 40 pounds per square inch and the pressure in the secondary chamber B, with the intermediate valve 26 closed, is normally on the order of 5 pounds per square inch.

The spring 168 normally acts on the operating diaphragm 147 to hold the valve member 155 closed in opposition to the fluid pressure in the secondary chamber B. When the engine that is supplied by the regulator is started, the solenoid 163 is automatically energized by the starting circuit to retract the solenoid core 164 against the opposition of the spring 168. When the spring pressure is removed by retraction of the solenoid 164, the valve member 155 retracts in response to the pressure in the secondary chamber and thereby permits flow of the gaseous fuel from the secondary chamber into the third chamber C to supply the initial starting fuel to the engine. Thus, while the regulator is normally operated by fluid pressure only, it is automatically operated for starting purposes in response to the electrical system of the engine. After the engine is started, of course, the solenoid 163 is de-energized and thereafter during the continued operation of the engine, fuel flow from the secondary chamber B to the third chamber C is controlled either by the valve member 155 in the by-pass between the two chambers or is controlled by the release valve 34, or in some instances by both valves.

In general, it is contemplated that the control diaphragm 147 in the auxiliary control 40 will respond to a lower fuel demand by the engine than the diaphragm 16 that controls the release valve 34 and it is further contemplated that the diaphragm 16 will open the release valve 34 in response to a lower fuel demand by the engine than is required for the auxiliary control means 45 to boost the pressure in chamber B from two pounds to five pounds per square inch. Thus, under the relatively low pressure condition in the engine intake manifold prevailing when the engine is idling, the release valve 34 will be closed but the by-pass from the secondary chamber B to the third chamber C will be held open by the relatively low fluid pressure prevailing in the chamber 150 of the auxiliary control 40. At a higher rate of fuel consumption by the engine in the middle range of fuel demand, the diaphragm 16 will actuate the release valve 34 for direct flow of fuel from the secondary chamber B into the third chamber C in addition to the flow through the by-pass. At a higher fuel demand, for example, when the engine is accelerated, the outer diaphragm 105 of the auxiliary booster control 45 will function to boost the pressure in the auxiliary chamber B thereby to cause a relatively high rate of fuel flow from the primary chamber A into the secondary chamber B.

When the by-pass from the secondary chamber B to the third chamber C is open, for example, when the engine is first started, or when the engine is idling, the consequent reduction in pressure in the secondary chamber B below the normal pressure of approximately five pounds per square inch permits the spring 112 to open the intermediate valve 26 and the consequent reduction of pressure in the primary chamber causes the diaphragm 76 to open the inlet valve 20. In like manner, the opening of the release valve 34 by the diaphragm 16, in addition to the opening of the by-pass by the auxiliary economizer control 40, has an opening effect on the intermediate valve 26, which in turn has an opening effect on the inlet valve 20. When a peak demand causes outward flexure of the outer diaphragm 105 of the auxiliary control means 45, the normal pressure of five pounds per square inch exerted by the spring 112 drops to approximately two pounds per square inch and the intermediate valve 26 thereupon tends automatically to maintain the lower pressure of two pounds per square inch in the secondary chamber B and fuel flows at an exceptionally high rate from the primary chamber to the secondary chamber because of the increased pressure differential between the two chambers.

Whenever the diaphragm 16 flexes inward to operate the release valve 34, the initial inward flexure of the diaphragm first unseats the auxiliary release valve member 130 with two results. The first result is lowering of the pressure differential between the secondary chamber B and the third chamber C by virtue of escape of fluid through the auxiliary valve. The second effect is the local reduction of pressure in the region of the main valve member 120 by virtue of the pressure-reducing effect of the high velocity stream through the auxiliary valve. These two effects reduce the resistance to opening action on the part of the main release valve so that with continued inward flexure of the diaphragm 16, the main release valve is readily opened by impingement of the lever 135 against the end of the tubular valve stem 121.

It is apparent that the described regulator, by virtue of its successive chambers providing for successive stages of pressure reduction of the gaseous fuel, provides for smooth over-all control ranging from a minimum rate of fuel feed for an idling engine to a maximum rate to meet the demand for rapid acceleration of the engine. At the one extreme, the auxiliary control 40 serves as an economizer for minimizing fuel flow during idling of the engine and, at the other extreme, the auxiliary control 45 serves as a booster for accelerated fuel flow. The smooth operating performance of the regulator is enhanced, moreover, by the dual construction of the release valve 34.

The auxiliary control 40 not only serves the function of releasing fuel in response to the starting circuit of the engine and the function of feeding fuel for the idling engine, but also serves as a safety relief valve. Thus, if pressure rises excessively in the primary chamber, the intermediate valve 26 will yield to release fluid into the secondary chamber B and excessive rise of pressure in the secondary chamber B will force the valve member 155 in the by-pass to open in opposition to the spring 168 for release of fluid from the secondary chamber B into the third chamber C for escape to the carburetor of the engine.

In Figure 7, illustrating a modification of the invention, much of the structure is the same as heretofore described, as indicated by the use of corresponding numerals to indicate parts heretofore described. In this instance, the diaphragm 94 that operates the intermediate valve 26 spans a cavity 174 in the cover plate 12 that has a vent 175 to atmosphere and a suitable spring 176 is mounted in the cavity to press inward on the diaphragm. The boosting action to favor opening of the intermediate valve 26 in response to a peak demand for fuel is accomplished by operatively connecting the intermediate valve 26 with the diaphragm 16 that controls the release valve 34.

For this purpose one of the arms 91 of the operating lever 88 for the intermediate valve is pivotally connected to one arm of a small lever 177 that is mounted on a pivot pin 178. The second arm of the lever 177 is pivotally connected to a plunger 179 that is slidingly mounted in a bore 180 in the intermediate wall 11. The plunger 179 extends upward to terminate relatively close to the diaphragm 16 and is urged towards its position of maximum extension by a suitable coiled spring 181 that surrounds the plunger in compression between the wall 11 and a collar 182 on the upper end of the plunger.

When a relatively high fuel demand is made by the engine, the drop in pressure in the third chamber C causes the diaphragm 16 to depress the plunger 179 and thereby exert valve-opening force on the intermediate valve 26. Thus the intermediate valve opens wider than usual to permit greater than usual flow from the primary chamber A into the secondary chamber B with consequent greater fuel flow from the secondary chamber B into the third chamber C to supply the engine carburetor.

There is shown in Figure 8 a modified form of the economizer control which again may comprise a cup-shaped body 190 mounted on the main casting body by suitable screws 191. Here again the cup-shaped body 190 and its mounting screws 191 serve to secure a control diaphragm 192 that spans a cavity 193 in the main casting body and separates the cavity from what may be termed the control chamber 194 formed internally of the cup-shaped member 190. The cavity 193 communicates with the third chamber C through a passageway 195 and communicates with the secondary chamber B through a passageway 196 formed in the intermediate wall 11a.

A valve seat 197 is formed adjacent the one end of the passage 195 for cooperation with a valve member 198. The valve member 198 is preferably formed of a rubber-like material and is mounted to the diaphragm 192 by means of a bolt 199 passed through the diaphragm and threadedly engaged in a tapped opening formed in a large ferro-magnetic washer 201 facewisely engaging the opposite face of the diaphragm 192. If desired a suitable cement may be interposed between the valve member 198 and the one face of the diaphragm 192 to seal the opening through the diaphragm.

The control chamber 194 is connected with the intake manifold of the engine by means of a tube 202 and is provided with a suitable vent or bleed port 203 to the atmosphere. As in the earlier described embodiment, when the pressure in the control chamber 194 is reduced by the suction effect of the engine intake manifold, the diaphragm 192 will respond by leftward movement, as viewed in Figure 8, to move the valve 198 from the seat 197 to permit flow of fuel from the secondary chamber B to the third chamber C.

An electro-magnet, including a coil 204 and a core 205, is mounted in the control chamber 194 for concurrent energization with the starting circuit of the engine. The circuit includes a wire 206 extending through the bleed port 203 and a ground wire 207. The coil of the magnet 204 is mounted within the control chamber by means of a small frame on which the coil is formed while the cylindrical core 205 is threadedly mounted in a tapped opening formed in the one wall of the body member 190. Actually the threaded portion of the core 205 forms a dual function in that rotation of the core permits an adjustment of the position of the one pole of the magnet relative to the washer 201 fixed to the diaphragm 192. The range of movement of the valve 198 can, therefore, be limited by merely rotatably adjusting the position of the core 205 in the wall of the body 190. To facilitate this adjustment, the outer end of the core 205 is formed with a kerf 208 for the reception of a screw driver or like tool.

It is believed that the operation of this form of the control should be obvious. Here again when the engine supplied by the regulator is started, the coil of the electromagnet is energized simultaneously with the starter motor and the magnetic attraction generated draws the washer 201 and consequently the diaphragm 192 to the left, as viewed in Figure 8, to move the valve 198 off the seat 197. This results in a flow of the gaseous fuel from the secondary chamber into the third chamber C to supply the initial starting fuel to the engine. Once the engine is started and the electro-magnet de-energized, fuel flow from the secondary chamber B to the third chamber C is controlled as in the earlier described embodiment of the regulator.

As the idling requirements of different engines will vary, the modified form of the control now being described includes a manual adjustment consisting of a needle valve 209 laterally projecting into the passageway 195. The needle valve 209 actually forms a terminal part of an elongate stud-like member, a portion of the shank of which is threaded as indicated at 210 and engaged in a tapped bore formed in the wall 11a and registering with a passage formed in the cover 13a. The position of the needle valve 209 can be adjusted by rotating the stud-like member and to facilitate this rotation, the stud-like member carries a head 211 formed with tool engaging surfaces for manipulation by a suitable wrench or the like.

To hold the valve 209 in a desired position of adjustment, a coil spring 212 is compressed between the head 211 and the outer surface of the regulator. The spring 212 tends to load the threads and prevents accidental rotation of the stud-like member, of which the needle valve forms a part. Once the engine supplied with the regulator is started and the valve 198 moved off its seat 197, the fuel requirements for a proper idling speed can be manually controlled by adjustment of the head 211 to position the needle valve 209 in the proper position relative to the passageway 195.

My description in specific detail of the presently preferred practice of the invention will suggest to those skilled in the art various changes, substitutions and other departures from the disclosure that properly lie within the scope and spirit of the appended claims.

I claim:

1. A regulator of the character described for regulating flow of fluid from its inlet port which is connected to a high pressure source to its outlet port which is connected to a fluid-consuming device having a suction intake, said regulator comprising: a primary chamber having said inlet port; an inlet valve controlling flow through said inlet port; a secondary chamber having an intermediate port for communication with said primary chamber; an intermediate valve for controlling flow through said intermediate port; a third chamber having said outlet port; valve means controlling flow from said secondary chamber to said third chamber; means responsive to pressure in said primary chamber to regulate said inlet valve to maintain a given pressure in the primary chamber; means responsive to pressure in said secondary chamber to regulate said intermediate valve to maintain a given lower pressure in said secondary chamber; means to operate said valve means between the secondary chamber and the third chamber in response to drop in pressure at said outlet port; and means to boost the opening action of said intermediate valve in response to a relatively large pressure drop at said outlet port.

2. A regulator of the character described for regulating flow of fluid from its inlet port which is connected to a high pressure suorce to its outlet port which is connected to a fluid-consuming device having a suction intake, said regulator comprising: a primary chamber having said inlet port; an inlet valve controlling flow through said inlet port; a secondary chamber having an intermediate port for communication with said primary chamber; and intermediate valve for controlling flow through said intermediate port; a third chamber having said outlet port; valve means controlling flow from said secondary chamber to said third chamber; means responsive to pressure in said primary chamber to regulate said inlet valve to maintain a given pressure in the primary chamber; means responsive to pressure in said secondary chamber to regulate said intermediate valve to maintain a given lower pressure in said secondary chamber; and a diaphragm responsive to the pressure at said outlet port to operate said valve means between the secondary chamber and the third chamber in response to drop in pressure at the outlet port, said diaphragm being operatively connected with said intermediate valve to boost the opening action of the intermediate valve in response to a relatively large drop in pressure at said outlet port.

3. A regulator of the character described for regulating flow of fluid from its inlet which is connected to a high pressure source to its outlet port which is connected to an internal combustion engine having a suction intake, wherein the regulator has a plurality of chambers connected in series including a first chamber in the series having said inlet and a last chamber in the series having said outlet port and wherein the regulator has a corresponding plurality of pressure-responsive valves controlling the flow of the gaseous fluid into the respective chambers, means to release gaseous fluid from the regulator to said suction intake in response to a relatively large reduction in pressure in the suction intake, said release means comprising: a by-pass from one of said chambers in said series other than said last chamber for communication with said intake to deliver gaseous fluid thereto independently of the last chamber in the series; a by-pass valve normally closing said by-pass; a control chamber for communication with said intake for drop in pressure in the control chamber in response to drop in pressure in the intake; and a diaphragm separating said control chamber from said by-pass, said diaphragm being operatively connected with said by-pass valve to open the by-pass valve in response to drop in pressure in the control chamber.

4. A regulator as set forth in claim 3 which includes electrically responsive means to open said by-pass valve.

5. A combination as set forth in claim 3 which includes spring means urging said by-pass valve towards its closed position.

6. A combination as set forth in claim 5 in which said spring means is inside said control chamber to exert force against said diaphragm.

7. A combination as set forth in claim 3 which includes spring means acting on the pressure-responsive valve of the next to the last chamber in said series of chambers in a direction to tend to increase the pressure in said next to the last chamber; and which includes means responsive to drop in pressure at said intake to exert opposing force on said spring means to reduce the force of the spring means against the pressure-responsive valve, whereby rise in pressure in said intake reduces said opposing force to cause increase in pressure in said next to the last chamber.

8. In the combination of an internal combustion engine having a suction intake and a starter circuit with a regulator for regulating flow of gaseous fluid from the inlet of the regulator which is connected to said high pressure source to its outlet port which is connected to said suction intake, wherein the regular has a plurality of chambers connected in series including a first chamber in the series having said inlet and a last chamber in the series having said outlet port, and wherein the regulator has a corresponding plurality of pressure-responsive valves controlling the flow of the gaseous fluid into the respective chambers, means to release gaseous fluid from the regulator to said suction intake independently of the pressure-responsive valve that controls the flow of the gaseous fluid into the last chamber in the series, said release means comprising: a by-pass valve normally closing said by-pass; a control chamber for communication with said intake for drop in pressure in the control chamber in response to drop in pressure in the intake; a diaphragm separating said control chamber from said by-pass, said diaphragm being operatively connected with said by-pass valve to open the by-pass valve in response to drop in pressure in the control chamber; and electrically actuated means responsive to energization of said starter circuit to open said by-pass valve.

References Cited in the file of this patent

UNITED STATES PATENTS

| | | |
|---|---|---|
| 1,354,311 | Landrum | Sept. 28, 1920 |
| 2,013,222 | Thomas | Sept. 3, 1935 |
| 2,125,610 | Hammond | Aug. 2, 1938 |
| 2,178,974 | Smith | Nov. 7, 1939 |
| 2,240,846 | Hanson | May 6, 1941 |
| 2,308,124 | Stettner | Jan. 12, 1943 |
| 2,314,444 | Crittenden | Mar. 23, 1943 |
| 2,394,104 | Rankin | Feb. 5, 1946 |
| 2,599,577 | Norgren | June 10, 1952 |
| 2,635,392 | Gratzmuller | Apr. 21, 1953 |
| 2,645,884 | Kellie | July 21, 1953 |
| 2,661,578 | Niesemann | Dec. 8, 1953 |
| 2,664,872 | Ericson | Jan. 5, 1954 |

FOREIGN PATENTS

| | | |
|---|---|---|
| 13,454 | Great Britain | of 1896 |
| 600,871 | Germany | of 1934 |
| 343,636 | Italy | of 1936 |